United States Patent
Schutt et al.

[15] 3,639,250
[45] Feb. 1, 1972

[54] PHOTOTROPIC COMPOSITION OF MATTER

[72] Inventors: John B. Schutt, Silver Spring; Joe A. Colony, Lanham; Donald R. Lepp, District Heights, all of Md.

[73] Assignee: The United States of America as represented by the National Aeronautics and Space Administration

[22] Filed: Aug. 1, 1968

[21] Appl. No.: 749,320

[52] U.S. Cl. ................................... 252/300, 96/90 PC
[51] Int. Cl. ........................................... F21v 9/06
[58] Field of Search .............. 252/300; 96/90 PC; 350/16 CP

[56] References Cited

UNITED STATES PATENTS

| 3,314,795 | 4/1967 | Dorion et al. | 96/90 PC |
| 2,515,940 | 7/1950 | Stookey | 350/1 |
| 3,325,299 | 6/1967 | Araujo | 252/300 |

Primary Examiner—George F. Lesmes
Assistant Examiner—J. P. Brammer
Attorney—R. F. Kempf, E. Levy and G. T. McCoy

[57] ABSTRACT

The invention provides a phototropic composition of matter suitable for use in producing directly a positive photographic image comprising at least one member of the group consisting of lithium and lithium-containing substances with at least one member of the group consisting of titanium dioxide, tin dioxide, and alkaline earth titanates, and with at least one member of the group consisting of elements from groups 1A, 2A, 3B, 4B, 5B, 6B, 7B, 8, 1B, 2B, 3A, 4A, 5A, and the rare earth or outer transition series including cerium through lutecium in the periodic table, and compounds thereof, the mixture being heated until it is sensitive to ultraviolet light upon cooling.

8 Claims, No Drawings

PHOTOTROPIC COMPOSITION OF MATTER

The invention described herein was made by employees of the United States Government and may be manufactured or used by or for the United States Government for governmental purposes without the payment of any royalties thereon or therefor.

This invention relates to a phototropic composition of matter, and to a method of making the composition. More particularly, the invention relates to an inorganic phototropic composition of matter, and to the method of making the composition.

Several phototropic compositions, which are used in photographic film to produce directly a positive image upon impingement by light, have been previously disclosed in the art. However, many of the previously disclosed phototropic compositions are made of the expensive precious metals by methods which are both time consuming and costly.

It is an object of this invention to provide a new phototropic composition of matter made of relatively inexpensive ingredients.

It also is an object of the invention to provide a method of making a new phototropic composition of matter which is both rapid and inexpensive.

It is another object of the invention to provide a phototropic composition of matter comprising at least one member of the group consisting of lithium and lithium-containing substances, at least one member of the group consisting of anatase, titanium dioxide preferably in the form of rutile and/or tin dioxide and alkaline earth titanates, and at least one member of the group consisting of elements and compounds thereof selected from any one of several groups of the periodic table, the composition being heated or reacted until it is sensitive to ultraviolet light upon cooling.

Other objects and advantages of the invention are apparent from the following disclosure and appended claims.

Accordingly, the invention provides a phototropic composition of matter comprising (a) at least one member of the group consisting of lithium and lithium-containing substances; (b) at least one member of the group consisting of rutile or anatase, tin dioxide and akaline earth titanates; and (c) at least one member of the group consisting of elements selected from groups 1A, 1B, 2A, 2B, 3A, 3B, 4A, 4B, 5A, 5B, 6B, 7B and 8, and the rare earth or outer transition series of the periodic table including cerium through lutecium and compounds thereof, said composition being sintered until it is sensitive to ultraviolet light upon cooling.

The phototropic composition of the invention is prepared by blending or mixing (a), (b) and (c), preferably in an aqueous slurry, and reacting the blend until it is sensitive to ultraviolet light upon cooling.

Although the duration and temperature at which the reaction is effected depends upon the nature and amounts of the ingredients used in the composition, generally temperatures within the range of from 1800° to 2,200° F. maintained for a time within the range of from 5 minutes to 1 hour are suitable for reacting the composition of the invention until it is sensitive to ultraviolet light upon cooling. As used herein, ultraviolet light means light within the range of from 2,500 to 3,600 Angstroms.

The relative proportions of constituents (a), (b), and (c), although dependent upon the ingredients selected, can suitably be: from about 1 percent to about 6 percent of constituent (a) based on the weight of constituent (b), and at least 0.1 percent of constituent (c) based on the weight of constituent (b). In preparing the composition of the invention, it is convenient to blend the constituents (a), (b), and (c) in a slurry with water, after which the slurry is heated to dryness before reacting is effected as described above.

Constituent (a) broadly comprises at least one member of the group consisting of lithium and lithium-containing substances, examples of which are the oxides, carbonates, citrates, oxalates, and halides of lithium. Constituent (c) is at least one member of the group consisting of the elements selected from groups 1A, 1B, 2A, 2B, 3A, 3B, 4A, 4B, 5A, 5B, 6B, 7B, and 8, and the rare earth or outer transition series of the periodic table including cerium through lutecium of the periodic table, and compounds thereof. The rare earth or outer transitions series elements include those having atomic weights from 58 through 71 inclusive. Examples of elements suitable for use in the composition of the invention include copper (II) oxide, rhodium heptoxide, palladium oxide, potassium hydroxide, barium oxide, yttrium oxide, zinc oxalate, antimony oxide, manganese dioxide, tin oxalate, boric oxide, molybdenum chloride, and the like.

The composition of this invention can be applied to a film or paper photographic base support as part of a gelatin emulsion, or as a binder-free layer by vacuum deposition of the composition in vapor form, or by any other means known to the art. After an image is formed therein by impingement of the photographic layer with visible and/or ultraviolet light, the composition can be restored to its original state by bleaching same at a temperature within the range of from 140° to 575° F. until the composition is restored to a lighter color as in its original state.

The following examples illustrate preparation of several specific compositions within the scope of the invention, and illustrate the effect of ultraviolet light thereon after reacting the constituents until the composition is sensitive to ultraviolet light upon cooling.

EXAMPLE I

To 10-gram samples of anatase, tin dioxide, and rutile were added 1.5 mole percent of lithium as an hydroxide, oxide, peroxide, nitrate, nitrite, and sulphate—together or separately—and 0.1 mole percent of copper (II) as an oxide or a soluble salt. The ingredients were slurried with sufficient distilled water for thorough mixing and were dried while stirring. The resultant mixture was placed into a furnace at 2,000° F., and reacted for 10 minutes. Upon exposure to an ultraviolet source, the composition underwent the following sequence of color changes: light yellow to brown to black-gray. Optimum color change was obtained with a composition containing 2.0 mole percent lithium and 0.15 percent copper (II).

EXAMPLE II

To a 10-gram sample of anatase, tin dioxide and rutile were added 1.5 mole percent of lithium hydroxide oxide, peroxide, nitrate, nitrite, and a sulphate—together or separately—with 0.009 grams of rhodium heptoxide or the molar equivalent as a soluble salt. The ingredients were slurried with sufficient distilled water for through mixing, and were dried while stirring. The resultant mixtures were put into a furnace at 2,200° F. and reacted for 10 minutes. Upon exposure to an ultraviolet source, the composition underwent the following sequence of color changes: orange-brown to gray-brown to dark green. Optimum results with this composition were obtained with 2.0 mole percent of lithium and 0.0096 grams of rhodium heptoxide.

EXAMPLE III

To 10-gram samples of anatase, tin dioxide and rutile were added 0.5 grams of lithium as an hydroxide, oxide, peroxide, nitrate, nitrite, and sulphate—together or separately—with 0.001 grams of palladium oxide and 0.0047 grams of rhodium heptoxide. The ingredients were slurried with sufficient distilled water for thorough mixing, and dried while stirring. The resultant mixture was put into a furnace at 2,200° F., and reacted for 10 minutes. Upon exposure to an ultraviolet source, the composition underwent the following sequence of color changes: orange to gray-brown to green-gray. Optimum results were obtained with a composition containing 1 gram of lithium and 0.002 grams of palladium oxide, together with 0.03 gram of thodium heptoxide.

EXAMPLE IV

To 10-gram samples of anatase, tin dioxide and rutile were added 0.1 gram of lithium as an hydroxide, oxide, peroxide, nitrate, nitrite, and sulphate—together or separately—with 0.15 gram of potassium as an oxide, peroxide or hydroxide. The ingredients were slurried with sufficient distilled water for thorough mixing, and dried while stirring. The resultant mixture was put into a furnace at 2,200° F. and reacted for 10 minutes. Upon exposure to an ultraviolet source, the composition underwent the following sequence of color changes: off-white to gray to dark gray. Optimum results were obtained with a composition containing 0.5 gram of lithium and 0.3 gram of potassium hydroxide.

EXAMPLE V

To 10-gram samples of anatase, tin dioxide and rutile were added 0.09 gram of lithium as an hydroxide, oxide, peroxide, nitrate, nitrite, and sulphate—together or separately—with 0.19 gram of barium oxide, peroxide, or hydroxide. The ingredients were slurried with sufficient distilled water for thorough mixing, and dried while stirring. The resultant mixture was put into a furnace at 2,150° F. and reacted for 15 minutes. Upon exposure to an ultraviolet source, the composition underwent the following sequence of color changes: off-white to gray to black-gray. Optimum results were obtained with a composition containing 0.2 gram of lithium and 0.03 gram of barium hydroxide.

EXAMPLE VI

To 10-gram samples of anatase, tin dioxide and rutile were added 0.06 gram of lithium as an hydroxide, oxide, peroxide, nitrate, nitrite, and sulphite—together or separately—with 0.028 gram of yttrium oxide. The ingredients were slurried with sufficient distilled water for mixing, and dried while stirring. The resultant mixture was put into a furnace at 2,200° F. and reacted for 10 minutes. Upon exposure to an ultraviolet source, the composition underwent the following sequence of color changes: cream to light gray to dark gray-brown. Optimum results were obtained with a composition containing 0.1 gram of lithium and 0.5 gram of yttrium sesquitrioxide.

EXAMPLE VII

To 10-gram samples of anatase, tin dioxide and rutile were added 0.08 gram of lithium as an hydroxide, oxide, peroxide, nitrate, nitrite and sulphate—together or separately—with 0.046 gram of zinc oxide. The ingredients were slurried with sufficient distilled water for thorough mixing, and were dried while stirring. The resultant mixture was reacted at 2,200° F. for 10 minutes. Upon exposure to an ultraviolet source, the composition underwent the following sequence of color changes: light cream to gray to light brown. Optimum results were obtained with a composition containing 0.1 gram of lithium and 0.07 gram of zinc acetate.

EXAMPLE VIII

To 10-gram samples of anatase, tin dioxide and rutile were added 0.09 gram of lithium as an hydroxide, oxide, peroxide, nitrate, nitrite, and sulphate—together or separately—with 0.04 gram of antimony oxide. The ingredients were slurried with sufficient distilled water for thorough mixing, and were dried while stirring. The resultant mixture was reacted at 2,200° F. for 12 minutes. Upon exposure to an ultraviolet source, the composition underwent the following sequence of color changes: cream to gray to light brown. Optimum results were obtained with a composition containing 0.1 gram of lithium and 0.073 gram of antimony trioxide.

EXAMPLE IX

To gram samples of anatase, tin dioxide and rutile were added 0.08 gram of lithium as an hydroxide, oxide, peroxide, nitrate, nitrite, and sulphate—together or separately—with 0.008 gram of manganese oxide. The ingredients were slurried with sufficient distilled water for thorough mixing, and were dried while stirring. The resultant mixture was reacted at 2,200° F. for 10 minutes. Upon exposure to an ultraviolet source, the composition underwent the following sequence of color changes: tan to brown to dark gray. Optimum results were obtained with a composition containing 0.1 gram of lithium and 0.01 gram of manganous chloride.

EXAMPLE X

To 10-gram samples of anatase, tin dioxide and rutile were added 0.07 gram of lithium as an hydroxide, oxide, peroxide, nitrate, nitrite, and sulphate—together or separately—with 0.018 gram of molybdenum trioxide. The ingredients were slurried with sufficient distilled water for thorough mixing, and were dried while stirring. The resultant mixture was reacted at 2,200° F. for 15 minutes. Upon exposure to an ultraviolet source, the composition underwent the following sequence of color changes: cream to gray to brown. Optimum results were obtained with a composition containing 0.1 gram of lithium and 0.03 gram of molybdenum trioxide.

EXAMPLE XI

To 10-gram samples of anatase, tin dioxide and rutile were added 0.04 gram of lithium as an hydroxide, oxide, peroxide, nitrate, nitrite, and sulphate—together or separately—with 0.008 gram of boric oxide. The ingredients were slurried with sufficient distilled water for thorough mixing, and were dried while stirring. The resultant mixture was reacted at 2,100° F. for 10 minutes. Upon exposure to an ultraviolet source, the composition underwent the following sequence of color changes: off-white and white to light tan to dark gray. Optimum results were obtained with a composition containing 0.09 gram of lithium and 0.01 gram of boric acid.

EXAMPLE XII

To 10-gram samples of anatase, tin dioxide and rutile were added 0.08 gram of lithium as an hydroxide, oxide, peroxide, nitrate, nitrite and sulphate—together or separately—with 0.076 grams of tin dioxide. The ingredients were slurried with sufficient distilled water for thorough mixing, and were dried while stirring. The resultant mixture was reacted at 2,200° F. for 11 minutes. Upon exposure to an ultraviolet source, the composition underwent the following sequence of color changes: cream to gray to light brown. Optimum results were obtained with a composition containing 0.1 gram of lithium and 0.089 gram of tin dioxide.

EXAMPLE XIII

To 10-gram samples of anatase, tin dioxide and rutile were added 0.05 gram of lithium as an hydroxide, oxide, peroxide, nitrate, nitrite, and sulphate—together or separately—with 0.033 gram of niobium pentoxide. The ingredients were slurried with sufficient distilled water for thorough mixing, and were dried while stirring. The resultant mixture was reacted at 2,200° F. for 10 minutes. Upon exposure to an ultraviolet source, the composition underwent the following sequence of color changes: light cream to tan to brown. Optimum results were obtained with a composition containing 0.09 gram of lithium and 0.049 gram of niobium pentoxide.

Although the invention has been described with reference to certain specific embodiments thereof, it should be understood that the scope of the invention is limited only as defined in the appended claims.

What is claimed is:

1. A method of making a phototropic composition of matter comprising blending a composition consisting essentially of (a) about 1 to 6 weight percent, based on the weight of component (b), of at least one member of the group consisting of lithium, and lithium-containing substances selected from the group consisting of oxides, carbonates, citrates, oxalates, and halides of lithium; with (b) at least one member of the group consisting of anatase, rutile, tin dioxide and alkaline earth titanates; and with (c) at least about 0.1 weight percent up to about 5 weight percent, based on the weight of component (b) of at least one member of the group consisting of elements selected from groups 1A, 1B, 2A, 2B, 3A, 3B, 4A, 4B, 5A, 5B, 6B, 7B, 8 and the rare earth or outer transition series including from cerium to lutecium inclusive of the periodic table, and oxides, hydroxides, oxylates, and halides thereof, and reacting the blend of (a), (b), and (c) until it is sensitive to ultraviolet light upon cooling.

2. The method of claim 1 wherein said reacting is effected at temperatures within the range of from 1,800° to 2,200° F.

3. The method of claim 2 wherein said reacting is effected for a time within the range of from 5 minutes to 1 hour.

4. The method of claim 3 wherein said blend is formed by making a slurry in water of (a), (b) and (c), and wherein said slurry is heated to dryness before the reacting is effected.

5. A phototropic composition of matter consisting essentially of about 1 to 6 weight percent, based on the weight of component (b), of at least one member of the group consisting of lithium, and lithium-containing substances selected from the group consisting of oxides, carbonates, citrates, oxalates, and halides of lithium; (b) at least one member of the group consisting of anatase, rutile, tin dioxide, alkaline earth titanates; and (c) at least about 0.1 weight percent up to about 5 weight percent, based on the weight of component (b), of at least one member of the group consisting of elements selected from groups 1A, 1B, 2A, 2B, 3A, 3B, 4A, 4B, 5A, 5B, 6B, 7B, 8 and the rare earth or outer transition series including from cerium through lutecium inclusive of the periodic table, and oxides, hydroxides, oxylates, and halides thereof, said mixture having been reacted until it is sensitive to ultraviolet light upon cooling.

6. The composition of claim 5 wherein the reacting is effected at temperatures within a range of from 1,800° to 2,200° F.

7. The composition of claim 6 wherein the reacting is effected for a time within the range of from 5 minutes to 1 hour.

8. The composition of claim 7 wherein said mixture is formed by making a slurry of (a), (b) and (c), and wherein said slurry is heated to dryness before the reacting is effected.

* * * * *